United States Patent [19]
Kleber

[11] Patent Number: 5,263,377
[45] Date of Patent: Nov. 23, 1993

[54] REDUCED MASS ACCESSORY DRIVE SYSTEM

[76] Inventor: Richard M. Kleber, 9910 Ellis Rd., Clarkston, Mich. 48348

[21] Appl. No.: 740,978

[22] Filed: Aug. 6, 1991

[51] Int. Cl.⁵ .............................. F16H 37/00
[52] U.S. Cl. .................. 74/15.84; 74/15.63; 476/15
[58] Field of Search ............. 74/15.63, 15.82, 15.84, 74/15.88, 206, 212, 841

[56] References Cited

U.S. PATENT DOCUMENTS

| | | | |
|---|---|---|---|
| 798,230 | 8/1905 | Terzian | 74/206 |
| 2,930,257 | 3/1960 | Christenson | 74/15.63 X |
| 3,527,112 | 9/1970 | Korell | 74/206 |
| 3,583,243 | 6/1971 | Wilson | 74/15.84 |
| 3,915,030 | 10/1975 | Ritter | 74/15.63 X |
| 3,951,009 | 4/1976 | Audifferd, Jr. et al. | 74/15.63 |
| 4,129,043 | 12/1978 | Ishikawa | 74/15.84 X |
| 4,408,503 | 10/1983 | Kraus | 74/206 X |
| 4,493,222 | 1/1985 | Heine | 74/206 X |
| 4,583,415 | 4/1986 | Locker | 74/206 X |
| 4,838,101 | 6/1989 | Dobberpuhl et al. | 74/15.63 |
| 4,987,789 | 1/1991 | Rohs | 74/212 X |

Primary Examiner—Leslie A. Braun
Assistant Examiner—Benjamin Levi
Attorney, Agent, or Firm—Charles R. White

[57] ABSTRACT

A motor vehicle accessory drive system which powers vehicle accessories by diverting power from a primary motor to accessories by use of friction drive wheels, gears or other drive members mounted on the motor and drive shafts for the accessories. The system the rolling drive interfaces into contact and to constantly compensate for wear of the drive interfaces.

4 Claims, 1 Drawing Sheet

REDUCED MASS ACCESSORY DRIVE SYSTEM

FIELD OF THE INVENTION

The present invention relates to motor vehicle power transmission and accessory drive systems associated therewith and more particularly to a transmission for transmitting torque from a power source for vehicle propulsion and to a direct friction drive for power accessories.

BACKGROUND OF THE INVENTION

Motor vehicle accessory drive system of various types are known in the art. Most commonly used are drive systems which utilize pulleys and belts to transfer power from the primary power source to the accessories. Also known are systems which utilize friction wheels. However the systems using belts and pulleys are cumbersome and occupy a considerable amount of volume due to the clearance required for the belts and accessory support brackets. This is a particular problem in automobiles where engine compartment space is limited. Additionally, the belt driven systems are inoperative if the belt should break which is a frequent occurrence with these systems.

The systems which utilize friction wheels for the power transfer, through hypothetically superior to the belt driven systems, are not considered practical to those skilled in the art as they are subject to wear which makes frequent readjustment of the contact between the friction wheels necessary. For example, U.S. Pat. No. 4,709,587 issued to Fiornascente discloses a system for driving the accessories of a motor vehicle through the use of friction wheels of a particular design. However, the Fiornascente patent does not disclose a method for adjusting the contact between the friction wheels, a method for compensating for the inevitable wear of the friction wheels nor does it disclose a method for preventing damage to the friction wheels or to the power source should a foreign object traverse the friction wheels contact point. With systems utilizing friction wheels, as in the belt driven systems the potential placement of the accessories is another consideration, especially in front-wheel drive vehicles which have a shortage of available engine compartment space. The present invention solves the aforementioned problems existing with the prior known accessory drive systems.

SUMMARY OF THE INVENTION

The present invention provides a new and improved power transmission for driving a primary output and directly supporting and driving a plurality of accessories from a power source. A modified transmission, torque converter housing, clutch housing, engine block, or attachment thereto is connected to the power source. Friction wheel means, gear set or other drive is mounted upon the housing or engine block and are driven by a corresponding drive member driven by the power source output. The accessories are mounted upon the transmission housing, torque converter housing, clutch housing, engine block, or attachment thereto by hinge-like mountings. A friction wheel, gear set, or other drive is mounted upon the drive shaft of each accessory. The friction wheel, gear set, or other drives of the accessories are pressed into contact with the friction wheel, gear set, or other drive interface mounted on the power source's output shaft by partially compressed helical springs. The compression forces of these springs are readily adjustable through the use of threaded bolt-like members which pass through the springs and engage threaded apertures defined upon the modified transmission housing, torque converter housing, clutch housing, engine block, or attachment thereto. The compression force exerted by the springs allows the apparatus to place the friction wheel, gear set, or other drive under predetermined frictional drive loads while compensating for the inevitable wear of the friction wheel, gear set, or other drive interfaces as the springs constantly urge the friction wheel, gear set, or other drive interfaces of the accessories into contact with the friction wheel, gear set, or other drive interface mounted upon the power source output shaft.

Additionally, the springs prevent damage to the friction wheel, gear set, or other drive interfaces should a foreign object traverse the friction wheel, gear set, or other drives at their rolling contact points since they would allow the accessories and the drive friction wheel to swing away from the driving friction wheel, gear set, or other drive interface if the predetermined frictional force is exceeded.

With the exception of the contact surface of the drive wheels, all parts of the invention would be made of metal or a rigid material having high strength.

It is an object of the present invention to provide an accessory drive system which would be readily adaptable to a wide variety of power sources, such as internal combustion engines for motor vehicles that have accessories driven by the power source.

It is an additional object of the present invention to provide an accessory drive system which requires no belts or pulleys for its operation.

It is further object of the present invention to provide a new and improved transmission for motor vehicles featuring a space-saving accessory drive system with an annular friction drive member directly contacting a plurality of separate and discrete annular friction members for separate accessory drives.

It is further object of the present invention to provide an accessory drive system which has a minimum of components and therefor is of a straight forward design which simplifies manufacturing and implementation.

It is further object of the present invention to provide an accessory drive system which continuously and automatically compensates for wear of the primary and secondary drive wheels to maintain them consistently at a predetermined contact pressure.

It is yet another object of the present invention to provide an accessory drive system which can compensate for a foreign object traversing the frictional contact point, thereby avoiding damage tot he friction wheel, gear set, or other friction drive, accessories or power source.

Another object of this invention is to provide a new and improved accessory drive system which is manufactured of materials which are stable, durable, and inexpensive.

DETAILED DESCRIPTION OF THE PREFERRED EMBODIMENT

Figure 1:
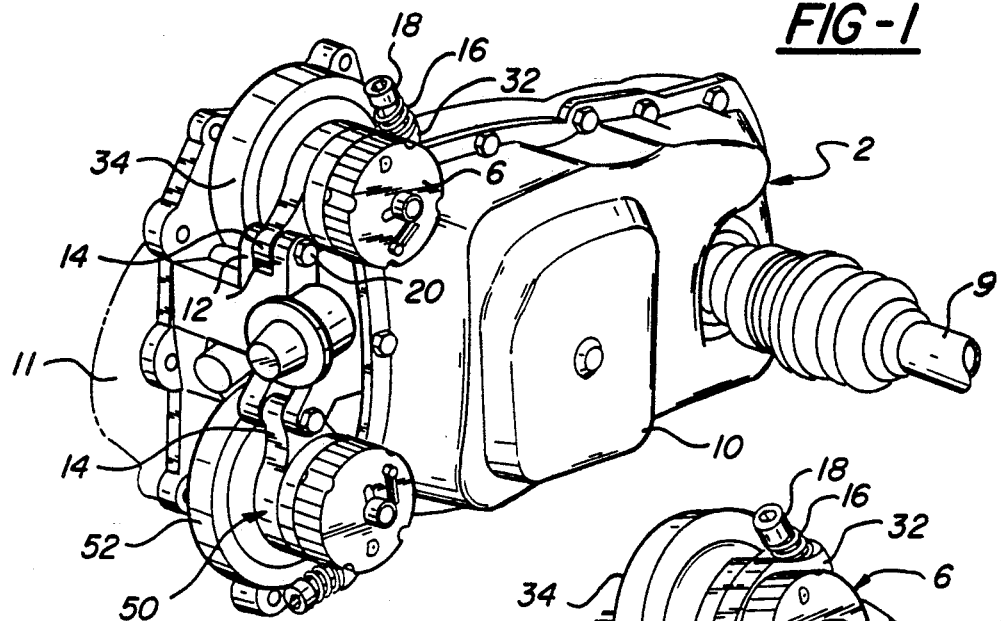
FIG. 1 is a pictorial view of a portion of a torque converter power transmission and an accessory drive.

FIG. 1 shows a transmission 2 which through a torque converter 4 and conventional change speed gearing drives the vehicle road wheels through paired axle shafts, one of which is identified by reference numeral 9, of a front-wheel drive motor vehicle. The torque converter 4 has a fixed housing 10 bolted, or otherwise fastened, to a motor or power source, such as internal combustion engine 11 having conventional output 13 for rotatably driving the converter 4. The U-shaped projection 12 of the torque converter housing 10 receives a second bolt 20 that serves as a pivot or hinge point for mounting one end of the accessory 6 by a first projection or lever arm 14 of the accessory 6. The second threaded bolt 20 passes through the aperture 38, shown in FIG. 3, in the U-shaped projection 12 of the torque converter housing 10 and the aperture 40, shown in FIGS. 2 and 3, defined in the first projection 14 of the accessory 6.

Figure 2:
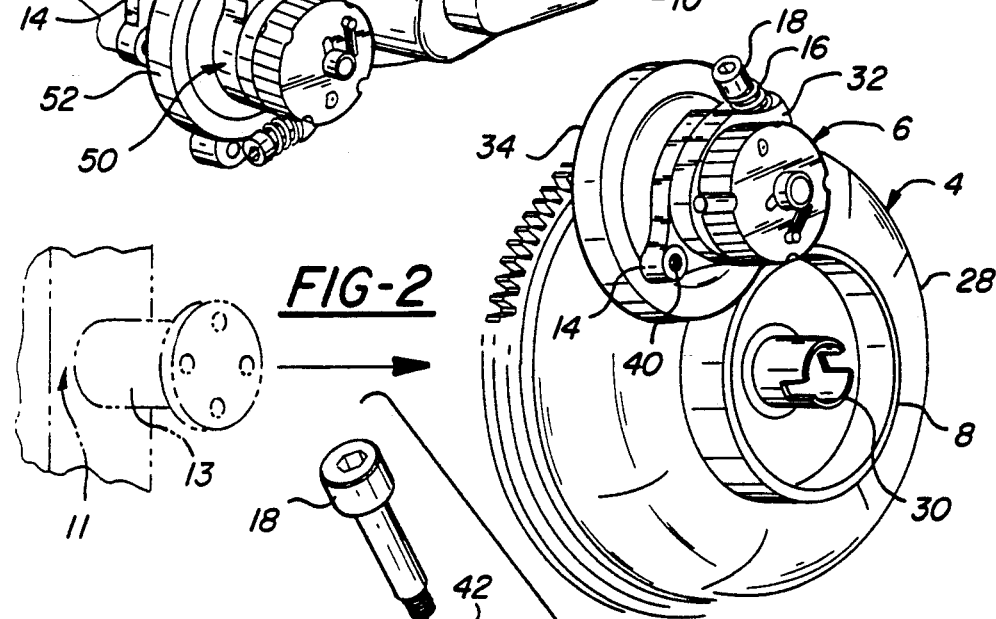
FIG. 2 is a pictorial view of certain components of the power transmission and the accessory drive of FIG. 1 to illustrate this invention.
Figure 3:
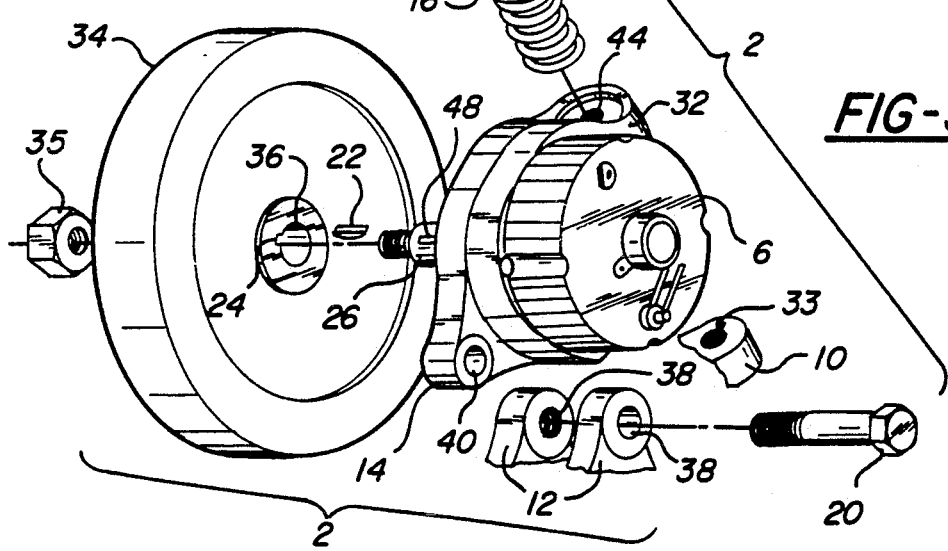
FIG. 3 is an exploded view of a portion of FIG. 3.

The first threaded bolt 18 passes through the opening 42, see FIG. 3, provided in the center of a helical preload spring 16 and the aperture 44 defined in the second projection 32 of accessory 6, operably engaging a threaded aperture 33 provided in the torque coverter housing 10. The accessory 6 would thereby pivot upon the second bolt 20, positioning the secondary drive wheel 34 in direct rolling contact with the primary drive wheel 8, shown in FIG. 2, with the contact pressure between the primary drive wheel 8 and the secondary drive wheel 34 being adjustable by turning the first threaded bolt 18 which is threaded into the threaded aperture 33 of the torque converter housing. The rolling contact pressure is maintained by the spring force f the helical spring 16 upon the second projection 32 of accessory 6. The force of the helical spring 16 upon the second projection 32 of accessory 6 also compensates for any wearing of either the primary drive wheel 8 or the secondary drive wheel 34. The helical spring 16 could be any biasing means known in the art.

FIG. 2 shows the primary drive wheel 8 secured to and projecting from the outer shell 28 of the engine driven torque converter co-axial with the projecting hub 30 of the torque converter, with the secondary drive wheel 34 in contact with the primary drive wheel 8 of the accessory 6.

FIG. 3 shows the secondary drive wheel 34 being connected to the accessory 6 by use of a keeper member 22 which would fit into a groove 24 defined on the inner surface of the aperture 36 which is defined upon the secondary drive wheel 34 and the groove 48 defined int he drive shaft 26 of accessory 6. The secondary drive wheel 34 would also be held in operable engagement with the drive shaft 26 of accessory 6 by use of a threaded nut 35 or any other known retaining means such as a cotter pin, rivet, set screw, etc.

An additional accessory 50, such as a pump or alternator, has the same construction as accessory 6 and has a frictional wheel 52 directly driven by primary drive wheel 8 in the manner described in connection with the drive of accessory 6. Accordingly, a single friction drive wheel 8 internal of the housing 10 directly contacts ad drives a plurality of external friction wheels 34 and 52 which drive associated accessories 6 and 50 to provide a highly compact and efficient accessory drive.

This is the inventor's preferred embodiment, but it will be understood, that the placement of the primary drive wheel 8 at some alternate position along the drive train, not shown, would only be a matter of preference or dictated by design considerations and would still be within the scope and intent of the present invention.

The foregoing description of the preferred embodiment is not meant to limit the scope of the claimed invention which may be practiced in a variety of embodiments. Further, the claimed invention will be best understood from a reading of the appended claims.

I claim:

1. A power transmitting system comprising a main power source, a primary output member adapted to be driven by said main power source, a power transmission operatively interconnecting said power source to said primary output member, a fixed housing for said transmission, an annular friction drive wheel member mounted within said fixed housing and adapted to be directly driven by said power transmission, an annular friction driven wheel member extending through said housing in direct rolling contact with said friction drive wheel member and adapted to be frictionally driven thereby, an accessory mounted eternally to said housing having shaft means driven by said driven friction wheel member, and adjustment means operatively mounted on said accessory for generating a yieldable load to the points of rolling contact of said drive and driven friction wheel members to compensate for frictional wear occurring therebetween and to continuously compensate for frictional slippage by yieldable holding said drive and driven friction wheel members in spring loaded driving frictional engagement with one another.

2. A power transmission with power take-off for diverting a portion of power generated by a primary power source driving a primary output to an accessory, comprising in combination:
   (a) a fixed housing;
   (b) a transmission internally mounted within said housing having an input member rotatably driven by said primary source of power;
   (c) an annular accessory driving wheel member internal of said housing secured to the said input member for rotation therewith;
   (d) an accessory externally mounted for pivotal movement on said housing adapted to be driven by power diverted from said primary power source;
   (e) said accessory having an external annular rotatable driven wheel member extending into said housing and into direct rolling drive engagement with said accessory driving wheel member with a drive contact force therebetween;
   (f) selectively movable means for adjusting the drive contact force of the rotatable driving wheel member and driven wheel member; and
   (g) said selectively movable means including spring means providing said contact force for yieldably urging said driving wheel member and driven wheel member into direct rolling contact with one another.

3. The transmission of claim 2, wherein said selectively movable means includes:
   (a) a threaded member extended through a portion of said accessory and into adjustable threaded engagement with said fixed housing; and
   (b) biasing means supported by said threaded member and operably engaged with the accessory for yieldably urging the drive surfaces into continuous spring loaded frictional contact with one another.

4. A power transmitting system comprising a main power source, a primary output member adapted to be driven by said main power source, a power transmission operatively interconnecting said power source to said primary output member, a fixed housing for said transmission, an annular friction drive member mounted within said fixed housing and adapted to be directly driven by said power transmission, an annular friction driven member extending through said housing in rolling contact with said friction drive member and adapted to be frictionally driven thereby, an accessory mounted externally to said housing having shaft means driven by said driven friction member, and adjustment means operatively mounted on said accessory for generating a yieldable load to the points of rolling contact of said drive and driven friction members to compensate for frictional wear occurring therebetween and to continuously compensate for frictional slippage by yieldably holding said drive and driven friction members in loaded driving frictional engagement with one another, said accessory having a main body with a pivot arm extending in a first direction therefrom, an opening for a pivot formed in said pivot arm, pivot means extending through said opening and secured to said housing, said accessory having a support extending in a direction opposite to that of said pivot arm, a threaded opening in said housing, said adjustment means comprising a compression spring having opposite ends seated on said support and a bolt member having a head at one end for contacting one end of said spring and having threads at the opposite end thereof for threaded engagement with said threaded opening in said housing so that said spring can be selectively and adjustably preloaded against said support to yieldably hold said friction drive and driven members in spring loaded fiction contact with one another.

* * * * *

UNITED STATES PATENT AND TRADEMARK OFFICE
CERTIFICATE OF CORRECTION

PATENT NO. : 5,263,377
DATED : November 23, 1993
INVENTOR(S) : Richard M. Kleber It is certified that error appears in the above-indentified patent and that said Letters Patent is hereby corrected as shown below:

Title page, item [57], Abstract: After "system" insert --utilizes compressions springs that provide an adjustable spring force for maintaining--.

Column 1, line 42, after "systems" insert --,--.
Column 2, line 54, delete "tot he" and insert -- to the--.
Column 3, line 35, after "force" delete "f" and insert --of--.
Column 3, lines 52-53, delete "int he" and insert --in the --.
Column 4, line 29, delete "yieldable" and insert --yieldably--.

Signed and Sealed this

Twentieth Day of September, 1994

Attest:

BRUCE LEHMAN

Attesting Officer    Commissioner of Patents and Trademarks